United States Patent

Rose et al.

[15] 3,658,560

[45] Apr. 25, 1972

[54] EASILY PEELED SYNTHETIC CASING

[72] Inventors: Henry J. Rose; Albin F. Turbak, both of Danville, Ill.

[73] Assignee: Tee-Pak, Inc., Chicago, Ill.

[22] Filed: Aug. 20, 1969

[21] Appl. No.: 851,760

[52] U.S. Cl. ................................................99/176, 117/144
[51] Int. Cl. .........................................................A22c 13/00
[58] Field of Search ............................99/176, 175; 117/144

[56] References Cited

UNITED STATES PATENTS

| | | | |
|---|---|---|---|
| 2,621,135 | 12/1952 | Brillhart | 117/144 |
| 2,985,545 | 5/1961 | Lewvitt | 99/176 UX |
| 3,307,956 | 3/1967 | Chiu | 99/175 X |
| 3,451,827 | 6/1969 | Bridgeford | 99/176 |
| 3,533,808 | 10/1970 | Cameron | 99/176 |

FOREIGN PATENTS OR APPLICATIONS

| | | | |
|---|---|---|---|
| 590,202 | 1/1960 | Canada | 117/144 |
| 1,009,587 | 11/1965 | Great Britain | 99/176 |

*Primary Examiner*—Frank W. Lutter
*Assistant Examiner*—Robert Halper
*Attorney*—Neal J. Mosely and David V. Munnis

[57] ABSTRACT

Sausages, such as frankfurters and bolognas, formed in synthetic casings are more easily peeled by soaking the casings, either at the time of manufacture or after stuffing with sausage emulsion, with a soluble non-toxic quaternary ammonium salt which will interact with components of the sausage emulsion to modify the surface characteristics of the sausage. The quaternary ammonium salts are preferably applied to frankfurter sausage casings at the tine of manufacture just prior to drying the casing. The quaternary ammonium salts may also be applied to the soak water for larger casings of the types used in the manufacture of bolognas. The quaternary ammonium salts may also be applied as an external soak bath to the casing before stuffing or to the stuffing sausages, both the frankfurter and bologna types, to saturate the casing and provide a uniform application of the quaternary ammonium salt to interact with sausage emulsion components at the surface contacting the casing. The use of casing soaked or impregnated with these quaternary ammonium salts facilitates removal of the casing from the smoked and/or cooked sausages at a time when the untreated casing could not be peeled from the sausages.

3 Claims, No Drawings

EASILY PEELED SYNTHETIC CASING

BACKGROUND OF THE INVENTION

1. Field of the Invention

In the preparation of sausages of various types, ranging from smaller sausages such as frankfurters and viennas up to large sausages such as bolognas, the sausage meat is normally extruded into a tubular casing for processing. In the early days of the packing industry, sausages were prepared using natural casings. About 40 years ago, casings were developed of regenerated cellulose which have been used in the preparation of sausages of all sizes. Clear, thin-walled, cellulosic casings were used primarily in the preparation of frankfurters and viennas. Larger diameter, heavy-walled, cellulosic casings, both clear and fibrous-reinforced, were used in the manufacture of larger sausages of the bologna type. In the manufacture of both large and small sausages, a major problem has been the stripping of the sausage casing from the sausage after it has been smoked and cooked by the meat packer. This problem has been especially great in the case of frankfurter sausages because of the large number of sausages processed.

In the preparation of frankfurters and other small sausages, a sausage paste or emulsion is extruded from a stuffing horn into a shirred sausage casing. The shirred casing will normally contain from 80 to 160 feet of casing in a shirred length of 10 to 20 inches. The sausage paste or emulsion is extruded into the casing at a high speed with the result that the entire length of the casing is filled with sausage emulsion in a few seconds. As the casing is filled with sausage emulsion it passes into a linking device which twists the casing to form individual sausages links. The encased lengths of sausage are then cooked and smoked and are stored in a refrigerated room for about 24 hours prior to peeling. After extended storage in the chill room the encased sausages are removed into a peeling room which is maintained at a relatively high humidity. The chilled sausage has a considerable amount of moisture condensed on its surface removing from the chill room which facilitates removal of the casing from the individual sausages. The sausages are passed through a commercial peeling machine which cuts open the casing without cutting the encased meat and removes the casing from the sausage. Sausages which are not separated from the casing by the automatic peeling machinery must be separated by hand which adds to the cost of processing. Normally, if a particular string of sausage is difficult to peel it is returned to the chill room and cooled for an additional period of time to allow the meat emulsion to set up more thoroughly and facilitate casing removal. In the process of frankfurters and other small sausages a major item of cost is the removal of casing from the finished sausages, particularly the cost of a high inventory in the chill room and the cost of hand peeling sausages which do not peel cleanly on the automatic peeling machinery.

2. Description of the Prior Art

The prior art has been concerned with the problem of improving the peelability of synthetic casings from sausages for many years. The attempted solutions to the problem suggested by the prior art have mainly involved the application of various coatings to the inner surface of the synthetic casings to permit the casings to be peeled more readily from the sausages. Weingand U.S. Pat. No. 2,709,138 discloses an internal release coating of a fatty isocyanate. Firth U.S. Pat. No. 3,106,471 discloses release coatings of fatty ketenes. Underwood U.S. Pat. No. 2,901,358 discloses release coatings of stearato chromic chloride chemically combined on the inner surface of the casing. Chiu U.S. Pat. No. 3,307,956 discloses release coatings of water soluble silicones. Turbak U.S. Pat. No. 3,442,663 discloses release coatings of water insoluble polymerized silicones applied internally as a polymerized methyl hydrogen siloxane. Bridgeford U.S. Pat. No. 3,451,827 discloses release coatings of lactic acid, calcium lactate, trisodium hexametaphosphate, aluminum sulfate, potassium aluminum sulfate, lecithin diammonium phosphate, carboxymethyl cellulose, silicone oil, calcium phytate, inositol, glycerophosphoric acid, acetylated monoglycerides, methyl cellulose, or cetyl alcohol applied internally to the casing during the mechanical shirring of the casing.

The prior art, as exemplified by the aforementioned patents, has had only limited success in providing easily peelable synthetic casings for frankfurters and other small size sausages. The various coatings disclosed in the prior art are applied to the interior of large size casings, such as those used for bolognas, etc., by an internal slug coating technique. This coating technique however is not applicable to the interior coating of frankfurter type synthetic sausage casings because of the very small diameter of such casings because of the very small and the speed of manufacture which makes it difficult to introduce a coating liquid inside the casing. Coating materials such as those disclosed in U.S. Pat. No. 3,307,956 may be added from the outside of the casing in aqueous solution. However, the silicone coating materials which are water soluble or soluble in aqueous alkali are not approved coating materials for use with meat or other food products. Coating materials of the type disclosed in U.S. Pat. Nos. 3,442,663 and 3,451,827 may be applied to small diameter casings during mechanical shirring on a shirring machine. The application of coatings during shirring however is somewhat irregular and often results in an interior coating which is incomplete in coverage and quite variable in thickness.

SUMMARY OF THE INVENTION

This invention is based upon the discovery that artificial sausage casings, particularly casings of regenerated cellulose, both of the clear cellulose and fibrous-reinforced types, may be more easily peeled from sausages processed in the casing when thoroughly impregnated or soaked with solutions of quaternary ammonium salts which interact with components of a sausage paste or emulsion to modify the surface properties of the sausage and permit easy release of the casing. The quaternary ammonium salts used must be non-toxic and are preferably applied to frankfurter type casings after completion of all of the chemical processing and washing and just prior to drying of the casing. The compounds are added in aqueous solutions having a pH greater than 4 with the result that the casing is not damaged on extended storage. The quaternary salts used in treating the casing are non-toxic materials which remain soluble after the casing has been dried and shirred. The quaternary salts which are saturated in and impregnated throughout the casing are extractable from the casing into the outer surface layer of the sausage paste or emulsion processed in the casing. Under these conditions the quaternary salts interact with proteinaceous or fatty or other components of the sausage paste or emulsion to modify the surface properties of the sausage and permit easy peeling of the casing from the sausage.

While this method of providing easy release of casing from sausages is primarily useful for frankfurter sausage casings it may be applied in a modified form both for frankfurter casing and larger sausage casings. In applying this invention to provide easy release of larger clear cellulose casings or fibrous casings from bolognas and the like, the quaternary ammonium salts used to impregnate the casings are applied to the casing in the soak water used to soften the casing just prior to stuffing with the sausage paste or emulsion or the stuffed sausage may be soaked for a short time in a solution of the quaternary salts to provide a sufficient amount of the salts at the surface of the casing to interact with the sausage emulsion or paste components and provide for easy release of the casing. Similarly, solution of the quaternary ammonium salts may be applied to encased frankfurters after stuffing and linking to soak the casings with the salts in an amount sufficient to interact with components of the sausage paste or emulsion to provide for easy peeling of the casing therefrom.

DESCRIPTION OF THE PREFERRED EMBODIMENTS

In the manufacture of regenerated cellulose sausage casings, viscose is extruded through an annular die into a coagulating and regenerating bath to produce a tube of regenerated cellulose. The tube is subsequently washed, plasticized with glycerin, and dried while inflated under a substantial air pressure for size control. After drying, the casing is wound on reels and subsequently shirred on high speed shirring machines, such as those described in U.S. Pat. Nos. 2,010,626; 2,583,654; 2,722,714; 2,722,715; 2,723,201; etc. Reinforced cellulose casing, also known as fibrous casing, is prepared by forming a tube of a long fiber hemp paper, or the like, impregnating the paper tube with viscose, and regenerating cellulose in and on the paper tube. The viscose-impregnated tube is passed into a coagulating and regenerating bath and then subsequently washed, plasticized with glycerin and dried under air pressure. Fibrous casing is used largely for the production of large sausages such as bolognas. Large diameter clear unreinforced regenerated cellulose casing is also used in the production of large bologna type sausages. Fibrous casing and the large clear cellulosic casings are normally sold as flat stock either in the form of reel stock or cut into pieces of predetermined length.

We have found that cellulosic casings, and other synthetic sausage casings are more readily peeled from sausages processed therein if thoroughly soaked with edible non-toxic quaternary ammonium salts. In the case of small diameter clear cellulosic casings of the type used in the production of frankfurter sausages, the quaternary ammonium salts are applied to the casing either in the glycerin bath or in a separate bath following the glycerin bath just prior to drying. The quaternary ammonium salts can also be applied to soak baths for larger diameter clear and fibrous casings or can be applied to soak baths for sausages encased in the casings, whether of the large or small size.

In carrying out this invention any soluble non-toxic edible quaternary ammonium salts may be used which will interact with components of the sausage emulsion to modify the surface characteristics of the sausage at the interface between the sausage and the casing. Typical quaternary salts which may be used include the following:

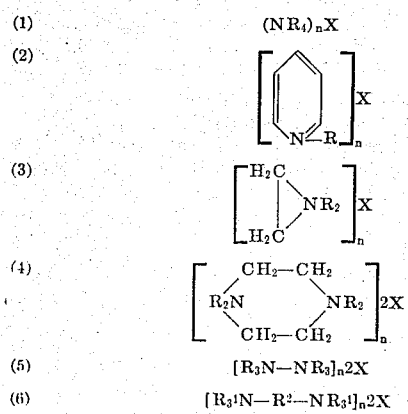

Where (a) X is a non-toxic salt anion such as chloride, bromide, sulfate, nitrate, acetate, citrate, etc., (b) $n$ is the valence of X, (c) R and $R^1$ are $C_1 - C_{20}$ alkyl, alkenyl, cycloalkyl, or aryl alkyl, including straight chain or branched chain forms, both unsubstituted and including alkyl, cycloalkyl, aryl, halo-, hydroxy-, ethoxy-, or propoxy- substituents, and (d) $R^2$ is a divalent radical containing to two 20 atoms, including $C_2$–$C_{20}$ alkylene or alkenylene, unsubstituted or containing inert substitutents.

Specific examples of said quaternary salts include $(CH_3)_4NCl$, $C_{12}H_{23}(CH_3)_3N\ Cl$, $C_{20}H_{39}(CH_3)_3N\ Br$, $C_{12}H_{21}(CH_3)_3N\ Cl$, $Cy$-$C_6H_{11}(CH_3)_3N\ NO_3$, $C_6H_5C_{12}H_{22}(CH_3)_3N\ Cl$, t-$C_4H_9(CH)_3N\ Cl$, $[C_{16}H_{31}(CH_3)_3N]_2SO_4$, $HOC_{12}H_{22}(CH_3)_3N$

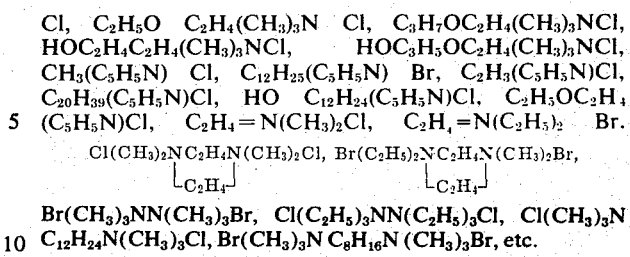

$Br(CH_3)_3NN(CH_3)_3Br$, $Cl(C_2H_5)_3NN(C_2H_5)_3Cl$, $Cl(CH_3)_3N\ C_{12}H_{24}N(CH_3)_3Cl$, $Br(CH_3)_3N\ C_8H_{16}N\ (CH_3)_3Br$, etc.

In demonstrating this invention, casings treated as described above are stuffed with sausage emulsion or paste and formed into sausage links. The stuffed casings are cooked and smoked and chilled for extended periods in accordance with standard commercial practice prior to peeling. The ease of peeling of the treated casing from the sausages encased therein is compared with the ease of peeling of untreated control casing. The treated casings are more easily peeled using standard commercial peeling equipment than are the untreated controls.

The following non-limiting examples are illustrative of the scope of this invention:

EXAMPLE 1

A solution is prepared by dissolving n-dodecyl trimethyl ammonium chloride ( $C_{12}H_{25}(CH_3)_3N\ Cl$ ) in about 5 gallons of water. The solution is diluted with additional water and glycerin to a volume of 50 gallons. The composition of the resulting solution is about 2 percent of the quaternary salt and 15 percent glycerin in water.

This treating solution is substituted for the glycerin bath used to plasticize regenerated cellulose casing in a commercial casing manufacturing process. The casing is passed through the bath at a linear speed of at least 75 feet per minute and has a residence time in the bath of about 20 seconds. The residence time of the casing in the bath is interdependent on the concentration of the bath. Thus, if a more dilute bath is used a longer residence time is required and likewise a much shorter residence time can be used if the bath is used in a more concentrated form. The casing passes from the treating bath to a dryer where the casing is dried under inflation with air pressure to prevent shrinkage. The casing leaving the dryer is wound on reels and subsequently shirred on a commercial shirring machine into shirred lengths of a size suitable for the meat packer who is to use the casing.

Some of the treated casings, together with untreated control casings, are stuffed with a commercial processing conditions. Frankfurters are normally stuffed into shirred casings and the casing filled out from a shirred length of 10–20 inches out 80–160 feet in the matter of a few seconds. As the casing is being stuffed it passes through a commercial linking machine to form a string of frankfurter lengths. The string of links is cooked and smoked and then placed in a chill room for a period of about 24–48 hours or longer if needed. The thoroughly chilled sausages are then brought into a highly humid room where moisture condenses on the casing to facilitate casing removal. The chilled and sweated frankfurter links are then passed through a commercial peeling machine which removes the casing from the individual links.

When the frankfurter links made from control casings and from casings treated in accordance with this example are removed from the chill room after 24–48 hours, the treated casing peels with substantially fewer peeling misses when the frankfurter links are passed through a commercial fast peeling machine. It should also be noted, that when treated casings are removed from the chill room after a residence period as short as 2 hours, the treated casings may be peeled from the frankfurters using standard commercial fast peeling machinery with very few peeling misses. Attempts at this point to peel control casing from the frankfurters results in 50–75 percent misses.

EXAMPLE 2

A treating solution is prepared by dissolving n-octyl trimethyl ammonium chloride ( n-$C_8H_{17}(CH_3)_3N\ Cl$ ) in about 5 gallons distilled water. This solution is then diluted to about 50 gallons by addition of further amounts of distilled water and glycerin. The composition of the treating bath is about 2 percent of the quaternary ammonium salt and 15 percent glycerin.

This treating solution is used in the treatment of commercial cellulose frankfurter casings as a substitute for the usual glycerin plasticizing bath. The casing is passed through the treating bath just prior to entering the dryer. After drying, the casing is reeled and subsequently shirred as is down with untreated control casing.

The shirred casing produced in accordance with this example is used together with untreated control casing in the preparation of commercial frankfurters. The processing conditions are essentially those described in Example 1. After 2½ hours chilling, the treated casings are removed more readily from the frankfurters using commercial fast peeling machinery while the untreated controls can not be so removed. After a full 24–48 hour chill period, the treated casings generally are substantially better in peeling than the untreated controls.

EXAMPLE 3

A treating solution is prepared by dissolving di-n-butyl dimethyl ammonium sulfate ( $(n-C_4H_9)_2(CH_3)_2N]_2SO_4$ ) in about 5 gallons distilled water. This solution is then diluted to about 50 gallons by addition of further amounts of distilled water and glycerin. The composition of the treating bath is about 3 percent of the quaternary ammonium salt and 15 percent glycerin.

This treating solution is used in the treatment of commercial cellulose frankfurter casings as a substitute for the usual glycerin plasticizing bath. The casing is passed through the treating bath just prior to entering the dryer. After drying, the casing is reeled and subsequently shirred as is done with untreated control casing.

The shirred casing produced in accordance with this example is used together with untreated control casing in the preparation of commercial frankfurters. The processing conditions are essentially those described in Example 1. After 2½ hours chilling, the treated casings are removed more readily from the frankfurters using commercial fast peeling machinery while the untreated controls can not be so removed. After a full 24–48 hour chill period, the treated casings generally are substantially better in peeling then the untreated controls.

EXAMPLE 4

A treating solution is prepared by dissolving cetyl pyridinium chloride

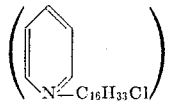

in about 5 gallons distilled water. This solution is then diluted to about 50 gallons by addition of further amounts of distilled water and glycerin. The composition of the treating bath is about 2 percent of the quaternary ammonium salt and 15 percent glycerin.

This treating solution is used in the treatment of commercial cellulose frankfurter casings as a substitute for the usual glycerin plasticizing bath. The casing is passed through the treating bath just prior to entering the dryer. After drying, the casing is reeled and subsequently shirred as is done with untreated control casing.

The shirred casing produced in accordance with this example is used together with untreated control casing in the preparation of commercial frankfurters. The processing conditions are essentially those described in Example 1. After 2½ hours chilling, the treated casings are removed more readily from the frankfurters using commercial fast peeling machinery while the untreated controls can not be so removed. After a full 24–48 hour chill period, the treated casing generally are substantially better in peeling than the untreated controls.

EXAMPLE 5

A treating solution is prepared by dissolving Cl $C_6H_{13}(CH_3)_2NCH_2CH_2CH_2N(CH_3)_2C_6H_{13}Cl$ in about 5 gallons distilled water. This solution is then diluted to about 50 gallons by addition of further amounts of distilled water and glycerin. The composition of the treating bath is about 3 percent of the quaternary ammonium salt and 15 percent glycerin.

This treating solution is used in the treatment of commercial cellulose frankfurter casings as a substitute for the usual glycerin plasticizing bath. The casing is passed through the treating bath just prior to entering the dryer. After drying, the casing is reeled and subsequently shirred as is done with untreated control casing.

The shirred casing produced in accordance with this example is used together with untreated control casing in the preparation of commercial frankfurters. The processing conditions are essentially those described in Example 1. After 2½ hours chilling, the treated casings are removed more readily from the frankfurters using commercial fast peeling machinery while the untreated controls can not be so removed. After a full 24–48 hour chill period the treated casings generally are substantially better in peeling than the untreated controls.

EXAMPLE 6

A treating solution is prepared by dissolving $(HOC_2H_4)_3N\ C_{20}H_{41}Cl$ in about 5 gallons by addition of further amounts of distilled water and glycerin. The composition of the treating bath is about 2 percent of the quaternary ammonium salt and 15 percent glycerin. This treating solution is used in the treatment of commercial cellulose frankfurter casings as a substitute for the usual glycerin plasticizing bath. The casing is passed through the treating bath just prior to entering the dryer. After drying, the casing is reeled and subsequently shirred as is done with untreated control casing.

The shirred casing produced in accordance with this example is used together with untreated control casing the preparation of commercial frankfurters. The processing conditions are essentially those described in Example 1. After 2½hours chilling, the treated casings are removed more readily from the frankfurters using commercial fast peeling machinery while the untreated controls can not be so removed. After a full 24–48 hour chill period, the treated casings generally are substantially better in peeling than the untreated controls.

EXAMPLE 7

A treating solution is prepared by dissolving

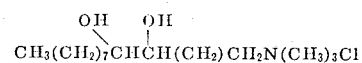

in about 5 gallons distilled water. This solution is then diluted to about 50 gallons by addition of further amounts of distilled water and glycerin The composition of the treating bath is about 2 percent of the quaternary ammonium salt and 15 percent glycerin.

This treating solution is used in the treatment of commercial cellulose frankfurter casings as a substitute for the usual glycerin plasticizing bath. The casing is passed through the treating bath just prior to entering the dryer. After drying, the casing is reeled and subsequently shirred as is down with untreated control casing.

The shirred casing produced in accordance with this example is used together with untreated control casing in the preparation of commercial frankfurters. The processing conditions are essentially those described in Example 1. After 2½ hours chilling, the treated casings are removed more readily from the frankfurters using commercial fast peeling machinery while the untreated controls can not be so removed. After a full 24–48 hour chill period, the treated casings generally are substantially better in peeling than the untreated controls.

EXAMPLE 8

A treating solution is prepared by dissolving Cl (CH₃)₃N (CH₂)₁₂N (CH₃)₃Cl in about 5 gallons distilled water. This solution is then diluted to about 50 gallons by addition of further amounts of distilled water and glycerin. The composition of the treating bath is about 2 percent of the quaternary ammonium salt and 15 percent glycerin.

This treating solution is used in the treatment of commercial cellulose frankfurter casings as a substitute for the usual glycerin plasticizing bath. The casing is passed through the treating bath just prior to entering the dryer. After drying, the casing is reeled and substantially shirred as is done with untreated control casing.

The shirred casing produced in accordance with this example is used together with untreated control casing in the preparation of commercial frankfurters. The processing conditions are essentially those described in Example 1. After 2½ hours chilling, the treated casings are removed more readily from the frankfurters using commercial fast peeling machinery while the untreated controls can not be so removed. After a full 24–48 hour chill period, the treated casings generally are substantially better in peeling than the untreated controls.

EXAMPLE 9

A treating solution is prepared by dissolving

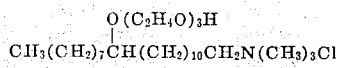

in about 5 gallons distilled water. This solution is then diluted to about 50 gallons by addition of further amounts of distilled water and glycerin. The composition of the treating bath is about 2 percent of the quaternary ammonium salt and 15 percent glycerin.

This treating solution is used in the treatment of commercial cellulose frankfurter casings as a substitute for the usual glycerin plasticizing bath. The casing is passed through the treating bath just prior to entering the dryer. After drying, the casing is reeled and subsequently shirred as is down with untreated control casing.

The shirred casing produced in accordance with this example is used together with untreated control casing the preparation of commercial frankfurters. The processing conditions are essentially those described in Example 1. After 2½ hours chilling, the treated casings are removed more readily from the frankfurters using commercial fast peeling machinery while the untreated controls can not be so removed. After a full 24–48 hour chill period, the treated casings generally are substantially better in peeling than the untreated controls.

EXAMPLE 10

A treating solution is prepared by dissolving

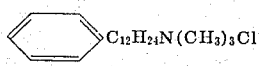

in about 5 gallons distilled water. This solution is then diluted to about 50 gallons by addition of further amounts of distilled water and glycerin. The composition of the treating bath is about 3 percent of the quaternary ammonium salt and 15 percent glycerin.

This treating solution is used in the treatment of commercial cellulose frankfurter casings as a substitute for the usual glycerin plasticizing bath. The casing is passed through the treating bath just prior to entering the dryer. After drying, the casing is reeled and subsequently shirred as is down with untreated control casing.

The foregoing examples have demonstrated that the impregnation and saturation of sausage casings with quaternary ammonium salts which are non-toxic is generally effective to provide improved peeling of the casing from frankfurters and similar sausages.

While the process has been described as applied to cellulosic casing it should be understood that the compounds mentioned may be applied to any synthetic sausage casings, such as casings of collagen, alginates, starch, dextran, polyvinyl alcohol, etc., where improved peelability of the casing is desired. The compounds used in treating the casings are ones which interact with the sausage emulsion or with specific components thereof. Without limiting ourselves to any particular theory of operation of the invention, we believe that the compounds used in the treating solution may function to tan, harden, or denature proteinaceous components of the sausage emulsion or may interact with the fatty components to provide soap-like derivatives which improve the peelability or release characteristics of the casing at the point of contact with the sausages encased therein. The compounds which are used in the treating solutions must be soluble in water or in the sausage emulsion under conditions of use so that they are mobile and readily leached or absorbed from the casing into or onto the surface of the sausage to interact with the surface layer or "skin" of the sausage on contact therewith to provide the improved release properties. The compounds in the treating solution are uniformly impregnated or saturated throughout the casing and are easily applied from outside the casing and this makes possible the preparation of an easy peeling casing without the necessity of coating the casing internally. Casings produced in accordance with this invention not only provide improved peelability but also permit the peeling of sausages at an earlier point in the processing, thus increasing the overall rate of processing of sausages through the meat packing plant.

We claim:

1. A process for treating an artificial sausage casing to improve the peelability of the casing from a sausage processed therein comprising impregnating said casing with a solution of a non-toxic soluble quaternary ammonium salt and drying said casing, said salt being soluble under conditions of sausage paste or emulsion processing and capable of interacting with one or more components of the sausage paste or emulsion to modify the surface of the sausage in contact with the casing.

2. A process as defined in claim 1 in which the quaternary ammonium salt is (a) a simple quaternary ammonium salt of the formula
$(NR_4)_nX$ (b) a pyridinium salt of the formula

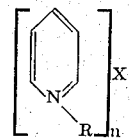

(c) a quaternary salt of ethylene amine of the formula

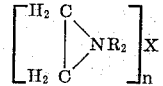

(d) a quaternary salt of diamine of the formula
$[R_3^1N-R^2-NR_3^1]_n2X$ (e) a quaternary diamine salt derived from piperazine of the formula

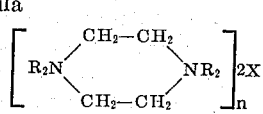

(f) a quaternary salt of hydrazine of the formula
$[R_3H-NR_3]_n2X$ wherein R and R¹ is $C_1-C_{20}$ alkyl, alkenyl, cycloalkyl, or aryl alkyl, including straight chain and branched chain forms, both unsubstituted and including alkyl, cycloalkyl, aryl, halo, hydroxy, ethoxy, or propoxy substituents, and R² is $C_2-C_{20}$ alkylene or alkenylene, unsubstituted or containing inert substituents, X is a non-toxic salt anion, and $n$ is the valence of X.

3. A process as defined in claim 1 in which said solution contains sufficient glycerin to plasticize the casing.

* * * * *